May 27, 1947.  J. PRINCE  2,421,285
INDUCTION TYPE ELECTRICITY METER
Filed May 7, 1943
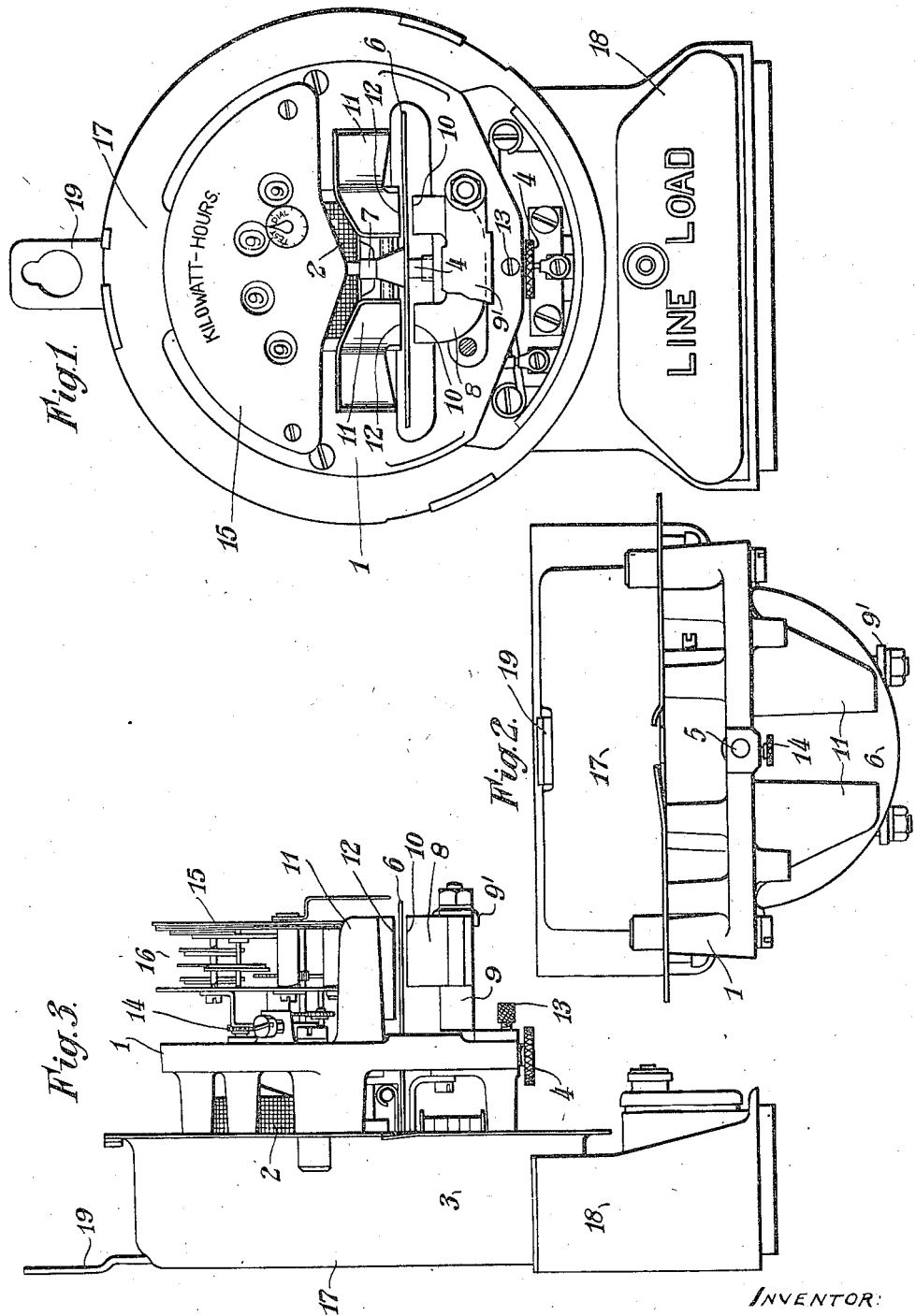
INVENTOR:
John Prince.
By his Attorney Walter Turner.

Patented May 27, 1947

2,421,285

UNITED STATES PATENT OFFICE 2,421,285

INDUCTION TYPE ELECTRICITY METER

John Prince, Brooklands, England

Application May 7, 1943, Serial No. 486,054
In Great Britain May 13, 1942

3 Claims. (Cl. 171—34)

This invention relates to induction type electricity meters.

In the design of such meters, where a braking magnet system co-acts with a rotor disc driven by series and shunt electromagnet driving systems, the braking system should be disposed adjacent to a different part of the disc from that which is adjacent to the driving systems in order to avoid interference. Further, in order to facilitate inspection of bearings or pivots the rotor should be removable. In practice these requirements lead to constructions in which the driving systems are conveniently disposed behind the rotor spindle and the braking system is disposed in front of the rotor spindle, the braking system being designed in such a manner as to enable the rotor with its spindle to be removed by frontal withdrawal without disturbance to the braking system. Usually also the construction of such meters includes a frame carrying the bearings or pivots for the rotor disc and to which the driving and braking systems are secured.

One construction of braking system designed for this purpose includes a pair of flat C-shaped magnets arranged in front of the rotor spindle and to right and left thereof respectively with the disc face to rotate between the pole faces of each magnet and with the magnets of such length that the disc can be withdrawn frontally between them whilst the ends of the magnets are spaced apart to permit passage of the spindle. Such a construction is suitable for meters having the permanent magnets made of steel of relatively low coercivity and high length/section ratio, as for example chrome or tungsten steels, as the construction is obviously suitable for relatively long magnets.

Where it is desired to use modern metals of high coercive force and low length/section ratio in order to enable the size and weight of the magnets to be substantially reduced, such construction is not suitable owing to the length of magnet required.

In a further known construction, using a high coercive metal the length of the braking magnet is only sufficient to yield the desired braking effect and is disposed wholly below the disc with its poles adjacent thereto. A bar of soft iron carried by the frame, which also carries the magnet, is arranged above the disc to provide a direct return magnetic path. This further known construction suffers from the drawback that such bar, being disposed in front of the spindle, prevents frontal withdrawal of the rotor.

The present invention is applicable particularly, though not exclusively, to meters employing braking magnets fabricated from material having a coercive force greater than about 250 oersted and which for the same power may be so much smaller and lighter than magnets made from the older steels of lower coercive force. Some such materials have come into use in recent years formed from iron having as principal alloying elements nickel and aluminium, with or without the addition of cobalt; "alnico" is a well-known typical example of these newer magnetic alloys. Other alloys are those known as the Honda steels which contain cobalt, nickel and titanium, with or without small amounts of aluminium. Honda steels have not so far been used commercially owing to their high cost of production, nevertheless any magnet formed from such a steel would have a high energy per unit column and would consequently be small and well-suited for employment in meters in accordance with the present invention. The use of such high coercive metals for the relatively long magnets of the older construction above described would be undesirable because of the waste of metal, with consequent additional cost and weight, whilst the magnets would be relatively fragile.

One object of the present invention is to provide an improved construction for an induction type electricity meter, which takes the above stated requirements into account, using a permanent magnet of either high or low coercivity.

Another object of the present invention is to provide a construction of an induction type electricity meter, the permanent magnet of which is fabricated from a material having a coercive force greater than about 250 oersted and in which the construction enables the principal characteristics of such material to be used for example to save both space and weight.

Referring to the accompanying drawings:

Fig. 1 shows a front elevational view of an induction type electricity meter in accordance with an embodiment of the invention, the front cover being removed.

Fig. 2 shows a plan view of the meter of Fig. 1, with the gear train and front cover removed.

Fig. 3 shows a side elevational view of the meter of Fig. 1, with the front cover removed.

In carrying the invention into effect according to the construction shown by way of example in Figs. 1, 2 and 3, an induction type electricity meter comprises a main frame 1 of cast iron which carries the driving system electromagnets 2 and 3 and also bearings 4, 5, the lower one being shown in Fig. 1 and the upper one in Fig. 2 for the rotor pivots. The rotor disc 6 is mounted so that its spindle 7 is in front of the driving system electromagnets.

The braking magnet 8 is formed from "alnico" and is U-shaped. It is mounted on a brass spacing block 9 and is held in position by means of a brass strap 9¹ below rotor disc 6 so that the faces of both poles 10, 10 presented to the under face of the disc lie in a plane parallel to that containing the disc; the location of magnet 8 is such that it is wholly below the disc and co-acts with the part of disc 6 in front of spindle 7. Above each pole 10, 10 of magnet 8 is a cast projection 11, 11 from and integral with the main frame 1, the cross-section of each projection being large enough to accommodate the braking flux. The projections 11, 11 have faces 12, 12 presented to the opposite faces of the disc and lying in a plane parallel to the plane of disc 6 and the gap distance between these surfaces and the faces 10, 10 of the poles of magnet 8 is appropriate to the braking effect desired. The projections 11, 11 when viewed from the front of the meter are disposed one on each side of the rotor spindle 4, the lateral separation of such projections leaving a frontal opening, wider than the spindle and from which the rotor spindle may pass for frontal withdrawal of the rotor disc. The axis of the spindle bearings (see Fig. 2) is actually located in the plane of the frame 1, which is formed with an aperture of sufficient depth at least to accommodate the spindle, the metal of the frame around such aperture forming a magnetic bridge part of the required depth to permit frontal withdrawal of the rotor disc with its spindle. Withdrawable bearings for the rotor pivots are locked in position by screws 13, 14. Rotation of the spindle is transmitted by way of a train of gear wheels 16 to a cyclometer train 15 which is fixed rigidly to the main frame 1. The whole is carried by a metal backplate 17 to the base of which a terminal box 18 is fitted. The meter may be fastened to an upright support by means of the arm 19 which is of adjustable length. The two projections 11 and the frame 1 together form a magnetic conductor complementary to the permanent magnet.

It is well known that "alnico" presents difficulties because it is not easily workable and it is thus necessary to either cast or sinter the material to obtain a desired shape. During either of these two processes strains are liable to be set up in the material which lead to a distortion of the magnetic field associated with the shaped magnet. Consequently it is desirable to have a simple shaped magnet and this is provided in the construction shown in the drawings. At the same time it is obvious that the magnet as shown in the drawing is of low length/section ratio so that full advantage may be taken of such characteristic of alnico or other magnetic steels of high coercivity and low length/section ratio to save space and weight and to have a robust shape of magnet. On the other hand, if magnetic metals of relatively high length/section ratio is to be used the disposition of the magnet is such that the necessary greater length can be accommodated without affecting the characteristic features of construction of the invention.

It will be appreciated that the rotor may be removed from the meter, without disturbing any part of either the driving or braking systems, merely by withdrawing the bearings which are normally locked in position in known manner.

What I claim is:

1. An induction type electricity meter comprising a frame, upper and lower spindle bearings carried by the frame, at least one of which is adjustable for releasing the spindle, a spindle mounted in the said bearings, a rotor disc secured to the said spindle, an electro-magnetic driving system for the disc carried by the frame at the back of the meter and an electro-magnetic braking system for the disc symmetrically disposed at the front of the meter opposite to the driving system, said braking system comprising a U-shaped permanent magnet located wholly on one side of the disc and across the front of the meter with its ends presented to the disc and its U of sufficient depth to permit the passage of the end of the spindle on that side of the disc for frontal withdrawal of the disc and a one-piece complementary magnetic conductor located on the other side of the disc said conductor including a pair of arms projecting forwardly having faces complementary to those of the ends of the magnet and a rear bridge part behind the said spindle joining said arms, the space between the said arms and the arch of the said bridge part providing a passage for the spindle for frontal withdrawal of the disc without disturbing any part of the said braking system.

2. An induction type electricity meter comprising a frame, upper and lower spindle bearings carried by the frame, at least one of which is adjustable for releasing the spindle, a spindle mounted in the said bearings, a rotor disc secured to and near one end of the said spindle, an electro-magnetic driving system for the disc carried by the frame at the back of the meter and an electro-magnetic braking system for the disc symmetrically disposed at the front of the meter opposite to the driving system, said braking system comprising a short shallow U-shaped permanent magnet of a material of high coercive force located wholly on the side of the disc facing the shorter end of the spindle with its U of sufficient depth to permit the passage of such shorter end of the spindle for frontal withdrawal of the disc and a one-piece complementary magnetic conductor located on the other side of the disc, the said conductor including forwardly projecting arms, having faces complementary to those of the ends of the magnet and a rear bridge part, the space between the said arms and the arch of the said bridge part providing a passage for the longer end of the spindle for frontal withdrawal of the disc without disturbing any part of the said braking system.

3. An induction type electricity meter comprising a frame of magnetic material, upper and lower spindle bearings carried by the frame, at least one of which is adjustable for releasing the spindle, a spindle mounted in the said bearings, a rotor disc secured to and near one end of the said spindle, an electro-magnetic driving system for the disc carried by the frame at the back of the meter and an electro-magnetic braking system for the disc symmetrically disposed at the front of the meter opposite to the driving system, said braking system comprising a short shallow U-shaped permanent magnet of a material of high coercive force located wholly on the side of the disc facing the shorter end of the spindle with its U of sufficient depth to permit the passage of such shorter end of the spindle for frontal withdrawal of the disc and a one-piece complementary magnetic conductor located on the other side of the disc, said conductor including forwardly projecting arms integral with the frame, having faces complementary to those of the ends of the magnet and a rear bridge part in the frame itself, the space between the said arms and the arch of the said bridge part providing a passage for the longer end of the spindle for frontal withdrawal of the disc without disturbing any part of the said braking system.

JOHN PRINCE.

REFERENCES CITED

The following references are of record in the file of this patent:

UNITED STATES PATENTS

| Number | Name | Date |
|---|---|---|
| 1,798,138 | Beusch | Mar. 31, 1931 |
| 1,962,929 | Faus | June 12, 1934 |
| 2,209,969 | Green | Aug. 6, 1940 |
| 2,323,465 | Green | July 6, 1943 |
| 1,194,129 | Bradshaw et al. | Aug. 8, 1916 |

FOREIGN PATENTS

| Number | Country | Date |
|---|---|---|
| 455,513 | Great Britain | Feb. 21, 1940 |
| 441,526 | Great Britain | Jan. 21, 1936 |